United States Patent
Nakayama et al.

(10) Patent No.: US 7,221,828 B2
(45) Date of Patent: May 22, 2007

(54) OPTICAL WAVE LENGTH DIVISION MULTIPLEXING MODULE AND COMMUNICATION SYSTEM USING THE SAME

(75) Inventors: Hideo Nakayama, Kanagawa (JP);
Takeshi Nakamura, Kanagawa (JP);
Akira Sakamoto, Kanagawa (JP);
Akemi Murakami, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 243 days.

(21) Appl. No.: 10/861,353

(22) Filed: Jun. 7, 2004

(65) Prior Publication Data
US 2004/0252736 A1    Dec. 16, 2004

(30) Foreign Application Priority Data
Jun. 11, 2003    (JP)    ............... 2003-166037

(51) Int. Cl.
*G02B 6/30* (2006.01)
*H01S 3/04* (2006.01)
*H01L 27/15* (2006.01)

(52) U.S. Cl. ............... 385/49; 385/52; 385/88; 385/92; 372/43.01; 257/79

(58) Field of Classification Search ............... 385/39, 385/49, 52, 88, 92; 372/43.01, 36; 257/79–82
See application file for complete search history.

(56) References Cited

U.S. PATENT DOCUMENTS

| 6,658,040 B1 * | 12/2003 | Hu et al. ............... 372/96 |
| 6,870,195 B2 * | 3/2005 | Lemoff et al. ............... 257/79 |
| 2004/0061346 A1 * | 4/2004 | Capewell ............... 294/64.1 |
| 2004/0247011 A1 * | 12/2004 | Okazaki et al. ............... 372/108 |

FOREIGN PATENT DOCUMENTS

| JP | 6-97578 | * | 4/1994 |
| JP | 11-340565 | | 12/1999 |

* cited by examiner

*Primary Examiner*—Frank G. Font
*Assistant Examiner*—Michael P. Mooney
(74) *Attorney, Agent, or Firm*—Oliff & Berridge, PLC

(57) ABSTRACT

A module for an optical wavelength division multiplexing communication includes semiconductor lasers emitting lights of wavelengths, a support member on which the semiconductor lasers are mounted, an optical fiber to which the lights emitted from the semiconductor lasers are incident, and a component that positions the optical fiber with respect to the support member and fixes the optical fiber thereto.

7 Claims, 9 Drawing Sheets

OPTICAL WAVE LENGTH DIVISION MULTIPLEXING MODULE AND COMMUNICATION SYSTEM USING THE SAME

BACKGROUND OF THE INVENTION

1. Field of the Invention

The present invention relates to an optical multiplexer equipped with a semiconductor laser device and applied to optical communication fields. More particularly, the present invention relates to an optical wavelength division multiplexing module equipped with a surface emitting semiconductor laser device and a communication system using the same.

2. Description of the Related Art

The wavelength division multiplexing (WDM) communication system has been developed in which light signals having different wavelengths are combined or multiplexed and are then transmitted over a single optical fiber, so that an increased optical transmission capacity can be obtained. A vertical-cavity surface-emitting laser (hereinafter, simply referred to as VCSEL) is suitable for the optical source of the optical wavelength division multiplexing.

A conventional optical WDM communication module is equipped with multiple VCSEL chips of different wavelengths housed and arrayed in a metal case. Laser lights of different wavelengths emitted from the VCSEL chips are combined in a single optical fiber via optical components such as a collimating lens and a condenser lens. A module on the receive side separates the multiplexed lights from the optical fiber into individual lights on the wavelength basis, and senses the separate lights of the respective wavelengths by means of light-receiving elements or the like.

Japanese Patent Application Publication No.11-340565 (Document 1) discloses, in FIG. 1, an optical coupling element and an optical coupling device. Lights emitted from an emitting part 11 of a surface-emitting type single-color VCSEL array 10 are collimated by a lens array 20 including multiple lens parts 21. The lights thus collimated are coupled in an optical fiber 40.

Japanese Patent Application Publication No. 6-97578 (Document 2) discloses a multi-wavelength semiconductor laser array for WDM in which the oscillation frequency is varied by changing the cross section of the laser waveguide integrated on a single substrate so that the array can oscillate with the multiple wavelengths.

However, there is a problem to be solved in the optical WDM communications using the VCSEL as the optical source. The device disclosed in Document 1 needs the collimating lenses 10 (lens array 20) and the condenser lens 30 to couple the lights from the source array 10 in the optical fiber, and thus needs optical alignment of two kinds of lenses as shown in FIG. 1 of Document 1. It is therefore necessary to precisely adjust the components. This increases the cost.

The technique disclosed in Document 2 changes the cross section of the waveguide or the resonator to thus vary the oscillation frequency. However, the wavelength can be changed within only a narrow range, and there is difficulty in widening the variable wavelength range. This allows only limited applications to the optical source in WDM communications. The optical WDM can be categorized into DWDM (Dense Wavelength Division Multiplexing) and CWDM (Coarse Wavelength Division Multiplexing). The DWDM is used for relatively expensive communications that employ wavelengths at short intervals and use many laser devices. The CWDM is used in relatively less-expensive, short-distance communications that employ wavelengths at long intervals and use four to eight laser devices. The CWDM requires the intervals equal to at least 20 nm. However, it is difficult to realize the wave intervals as long as 20 nm by the optical source described in Document 2, which is not suitable for CDMW.

SUMMARY OF THE INVENTION

The present invention has been made in view of the above circumstances and provides a module for an optical wavelength division multiplexing communication comprising: semiconductor lasers emitting lights of wavelengths; a support member on which the semiconductor lasers are mounted; an optical fiber to which the lights emitted from the semiconductor lasers are incident; and a component that positions the optical fiber with respect to the support member and fixes the optical fiber thereto.

According to another aspect of the present invention, there is provided a communication system comprising: a module for an optical wavelength division multiplexing communication; and a light-receiving module receiving multiplexed lights transmitted over an optical fiber of the module, the module comprising: semiconductor lasers emitting lights of wavelengths; a support member on which the semiconductor lasers are mounted; the optical fiber; and a component that positions the optical fiber with respect to the support member and fixes the optical fiber thereto.

BRIEF DESCRIPTION OF THE DRAWINGS

Preferred embodiments of the present invention will be described in detail based on the following figures, wherein.

DESCRIPTION OF THE PREFERRED EMBODIMENTS

Figure 1:
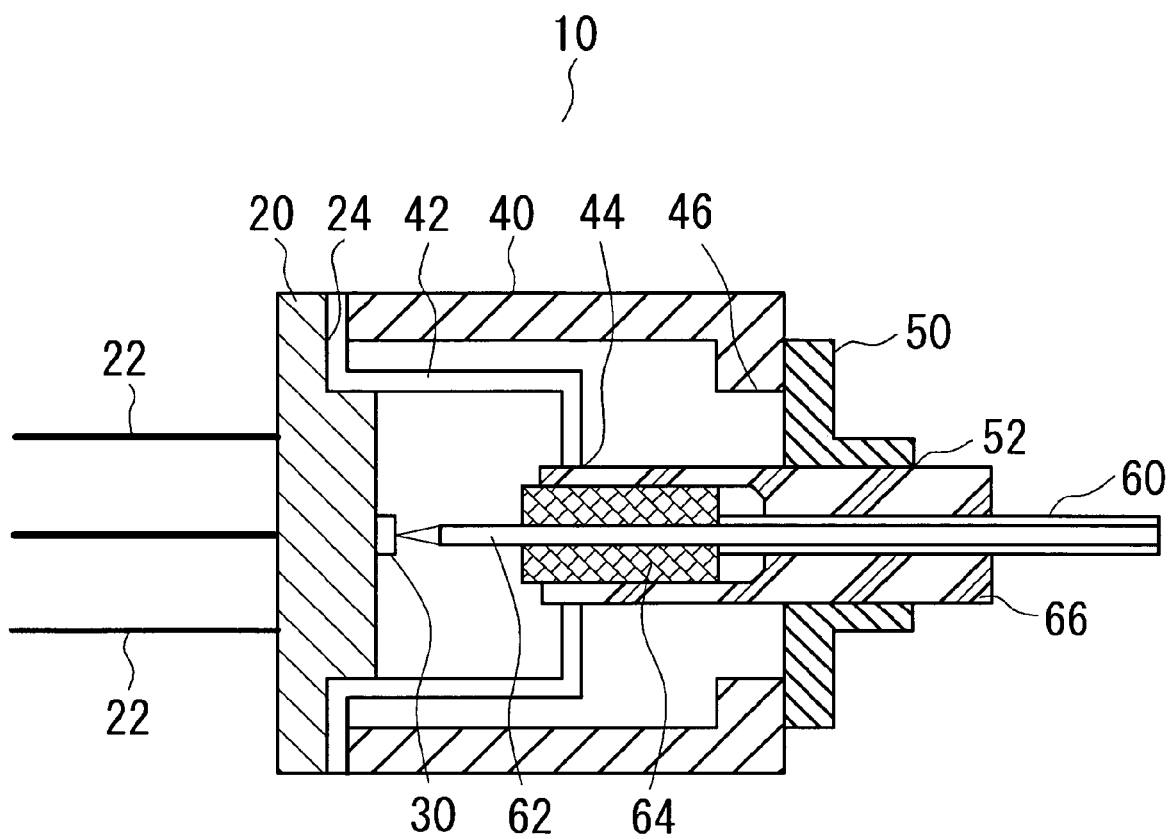
FIG. 1 is a sectional view of a module according to a first embodiment of the present invention.

A description will now be given of embodiments of the present invention with reference to the accompanying drawings. FIG. 1 is a sectional view of a module for optical WDM communications. A module 10 includes a metal stem 20 having a disc shape, multiple surface-emitting semiconductor laser (VCSEL) devices or chips 30, a hollow cylindrical housing 40 fixed to the metal stem 20, a holder 50, and an optical fiber 60. The VCSEL chips 30 are mounted on the metal stem 20 and are placed in position by using a mounter (not shown) serving as a support member. The holder 50 is attached to the housing 40 and holds an adjuster 66. The optical fiber 60 is attached to the adjuster 66.

Multiple lead pins 22 are connected to the metal stem 20, and are inserted into through holes so that one-side ends thereof are exposed from the surface of the metal stem 20. The exposed ends of the lead pins 22 are connected to electrode terminals of VCSEL chips $30n$ (n=a, b, c, . . . ) by bonding wires. The housing 40 is connected to a flange 24 formed on the circumferential periphery of the metal stem 20 through a support member 42. The support member 42 has a hollow cylindrical shape that is concentric with the housing 40, and has an opening 44 at one end. One end of the adjuster 66 is inserted into the opening 44 and is placed in position. A circular opening 46 is formed at an end of the housing 40. The holder 50 is fixed to the end of the housing 40 so as to cover the opening 46. The holder 50 has a circular opening 52 in its center. Preferably, the center of the opening 52 coincides with the center of the opening 44 of the support member 42. By adjusting the position of the holder 50, the optical fiber 60 can be appropriately positioned in the direction perpendicular to the optical axis of the optical fiber 60.

The holder 50 and the support member 42 support the adjuster 66 so that the adjuster 66 can slide through the openings 52 and 44 thereof. A through hole for holding the optical fiber 60 is formed in the adjuster 66, and is composed of a comparatively large hole and a comparatively small hole, these holes being joined. A ferule 64 is fitted into the large hole, and has a hole that matches the comparatively small hole. The optical fiber 60 is inserted from the comparatively small hole of the adjuster 66. A core 62 of the optical fiber 60 is supported by the ferule 64, and protrudes from the ferule 64. The adjuster 66 can slide in the axial direction (rightwards and leftwards), and the end of the adjuster 66 can be slightly moved in the radial direction by the support member 42. With the above-mentioned structure, the core 62 is aligned with the center of the VCSEL chips $30n$ and is located at a given distance from the VCSEL chips $30n$. Preferably, the optical fiber 60 is a plastic optical fiber (POF), which has a relatively large core size and is less expensive.

Figure 2:
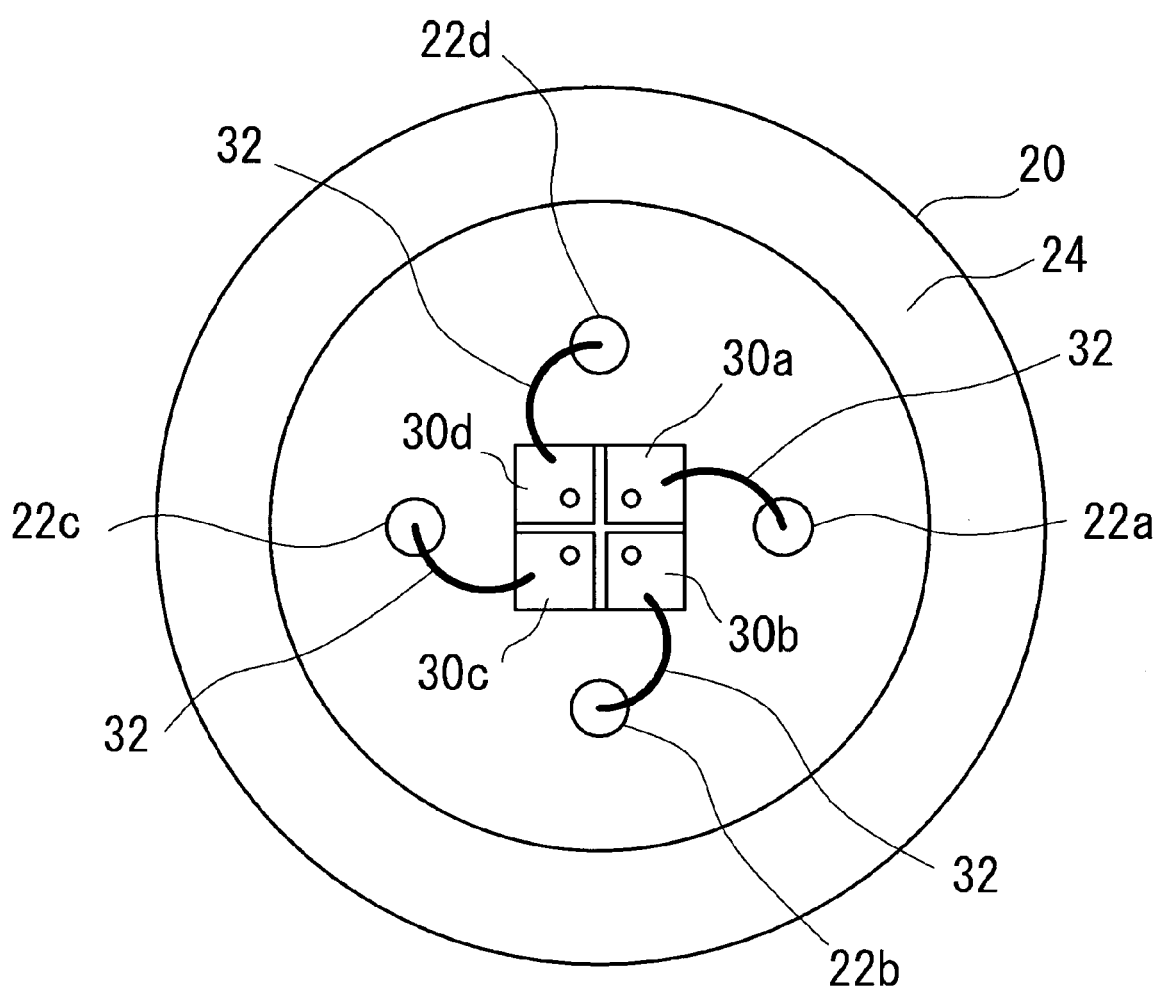
FIG. 2 is a plan view of VCSEL chips on a stem in which a housing has been removed.

FIG. 2 is a plan view of the metal stem 20 in which the housing 40 has been removed. The module 10 is equipped with four VCSEL chips 30a, 30b, 30c and 30d, which emit laser lights of wavelengths of 780, 800, 820 and 840. End surfaces 22a, 22b, 22c and 22d of the lead pins are exposed on the surface of the metal stem 20, and are electrically connected to p-side electrodes of the VCSEL chips 30a, 30b, 30c and 30d by bonding wires 32.

Figure 3A:
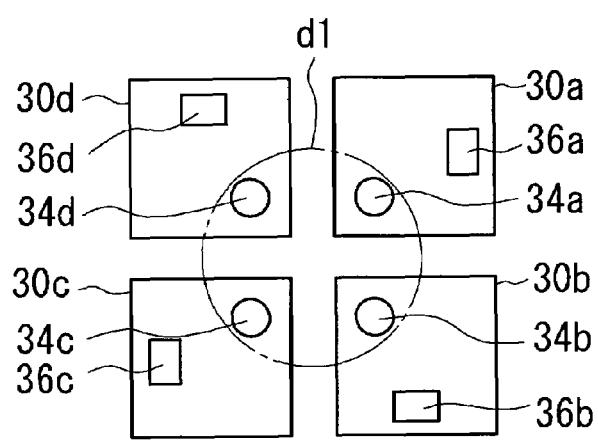
FIG. 3A shows an arrangement of the VCSEL chips.
Figure 3B:
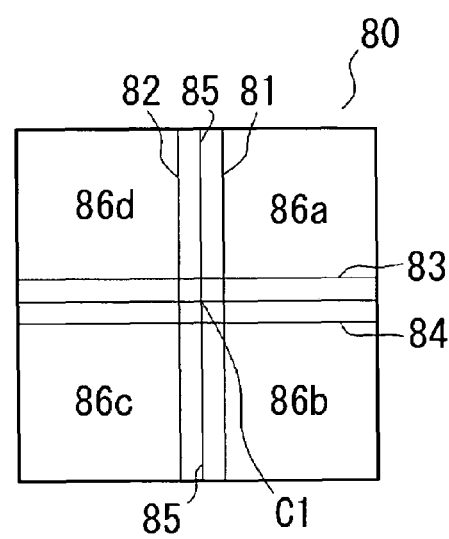
FIG. 3B is a plan view of a mounter.
Figure 4:
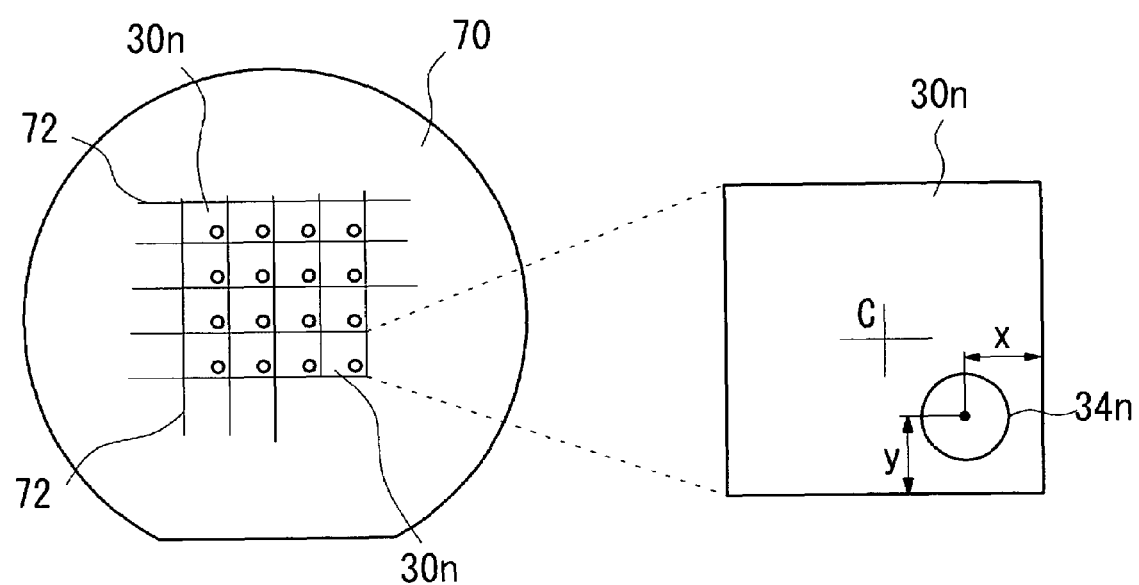
FIG. 4 shows VCSEL chips formed on a semiconductor wafer.

FIGS. 3A and 3B show the relationship between the VCSEL chips and the mounter. FIG. 4A is a plan view of a semiconductor wafer, and FIG. 4B is an enlarged plan view of one chip. As shown in FIG. 4A, multiple VCSEL chips are formed on a semiconductor wafer 70, which is divided into individual chips $30n$ having a square or rectangular shape by dicing along scribe lines 72, as shown in FIG. 4B. In each VCSEL chip, a mesa (or post) $34n$ (n=a, b, c, d, . . . ), which is the emitting point, is offset from the chip center toward one chip corner. The distances (x, y) to the two side surfaces crossing each other from the center of the mesa $34n$ are equal to each other. For example, one side of the chip $30n$ is approximately 600 μm long, and the distances x and y from the center to the two crossing sides are 20 μm. Generally, the mesa $34n$ has a cylindrical shape, but may be a rectangular column.

The four VCSEL chips mounted on the mounter are disposed so that the mesas 34a 34b, 34c and 34d thereof are close to each other, as shown in FIG. 3A. In other words, the mesas that are the emitting points of the VCSEL chips are disposed close to the optical axis of the optical fiber. In the present embodiment, the mesas $34n$ are offset towards the specific corners, so that the spots of the VCSEL chips can be arranged within a reduced spot size, as compared to the conventional device. The VCSEL chips have p-side electrodes 36a, 36b, 36c and 36d on the bottoms of the mesas, and n-side electrodes provided on the backsides of the substrates.

A mounter 80 is used to dispose the four VCSEL chips in a 2×2 array. The mounter 80 has a rectangular shape, and the surface thereof is plated with a metal of, for example, gold (Au). Vapor deposition may be used instead of plating. The n-side electrodes on the backsides of the substrates of the VCSEL chips can be connected to the gold films on the mounter 80. It is desired that the mounter 80 has a thermal expansion coefficient close to that of the substrates of the VCSEL chips. For instance, ceramic such as AlO or AlN may be used for the GaAs substrates of the VCSEL chips. The metal stem 20 is connected to the ground potential, so that the n-side electrodes of the VCSEL chips may be set at the same potential as that of the metal stem 20 by connecting the surface of the mounter 80 to the metal stems 20 by the bonding wires. The wire bonding may be omitted by coating the mounter 80 with a metal in advance so that the front and back surfaces of the mounter 80 have the identical potential.

Grooves 81, 82, 83 and 84 run on the surface of the mounter 80 in order to position the VCSEL chips in the 2×2 array. The grooves 81, 82 and 83 are parallel to the side surfaces of the mounter 80. The distances between the side surfaces of the mounter 80 and the grooves 81, 82 and 83 are equal to the length of one side of the VCSEL chips. More particularly, the VCSEL chip 30a is positioned in an area 86a defined by the grooves 81 and 83, and the VCSEL chip 30b is positioned in an area 86b defined by the grooves 81 and 84. The VCSEL chip 30c is positioned in an area 86c defined by the grooves 82 and 84, and the VCSEL chip 30d is positioned in an area 86d defined by the grooves 82 and 83. Preferably, crossing grooves 85 are formed so as to pass through the center of the mounter 80 and cross each other at the right angle. The crossing grooves 85 are used to position the mounter 80 on the metal stem 20. The lead pins 22a, 22b, 22c and 22d are positioned on extensions of the crossing grooves 85. Thus, the center C1 of the mounter 80 can be placed on the optical axis of the optical fiber 60.

The grooves 81 and 82 are spaced apart from each other at a pitch of 10 μm, and the grooves 83 and 84 are spaced apart from each other at a pitch of 10 μm. When the VCSEL chips $30n$ are placed on the mounter 80 in position, the mesas thereof (the emitting points) are automatically positioned at a pitch of 50 μm. The VCSEL chips $30n$ may be fixed to the mounter 80 by coating the mounter 80 with silver paste and annealing it.

Turning to FIG. 1 again, the center or optical axis of the optical fiber 60 or fiber core 62 is aligned in the center of the array of the mesas 34a, 34b, 34c and 34d (the center C1 of the mounter 80). As described above, the pitch between the VCSEL chips $30n$ is 50 μm, and the diameter d2 of the fiber core 62 is equal to or greater than at leas twice the diameter d1 of an inscribing circle for the mesas, in which the diameter d1 may approximate the distance or pitch between the mesas and may be nearly equal to 50 μm for the above-mentioned example. In the present embodiment, the diameter d2 of the fiber core 62 is 125 to 500 μm, so that an inequality of 2<d2/d1<10 approximately stands.

The distances L from the end surface of the optical fiber 60 to the VCSEL chips on the optical axis are approximately equal to 100 μm, and preferably satisfy the following condition:

$$L \leq \frac{(d2 - d1)}{2 \times \tan(\theta/2)}$$

where θ is the divergence angles of the laser beams emitted from the VCSEL chips.

When the above condition is satisfied, the optical fiber 60 can easily be aligned. In addition, by making the fiber core 62 close to the VCSEL chips 30n, the laser beams emitted therefrom can be directly brought in the optical fiber 60 without any optical components such as lenses, and can be coupled therein so that the wavelength division multiplexing can be achieved. This reduces the number of components and avoids the lens alignment work. The modules thus produced are less expensive.

Figure 5A:
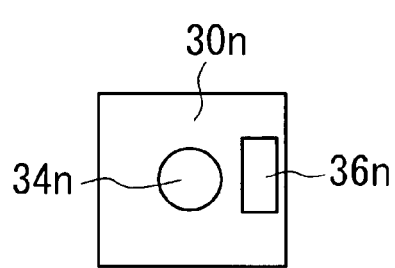
FIGS. 5A and 5B show VCSEL chips applicable to the first embodiment of the present invention.
Figure 5B:
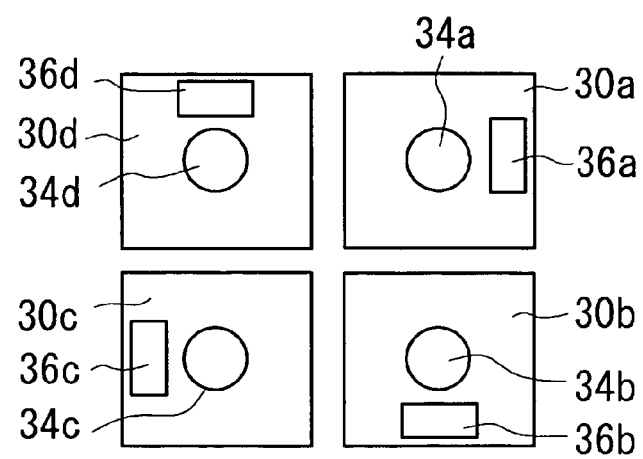

The above-mentioned embodiment has the mesas of the VCSEL chips that are offset from the respective centers as a preferable structure. However, the mesas are not limited to the offset arrangement. When the VCSEL chips have a small size, the mesa may be positioned in the center of the VCSEL chip, as shown in FIG. 5A. As is shown in FIG. 5B, the VCSEL chips 30a through 30d placed on the mounter may be arranged at a desired pitch or interval at which the mesas (emitting points) 34a through 34d are arranged. In the case of FIG. 5B, the laser beams can be coupled directly in the optical fiber without interposing the optical components such as lenses.

Figure 6:
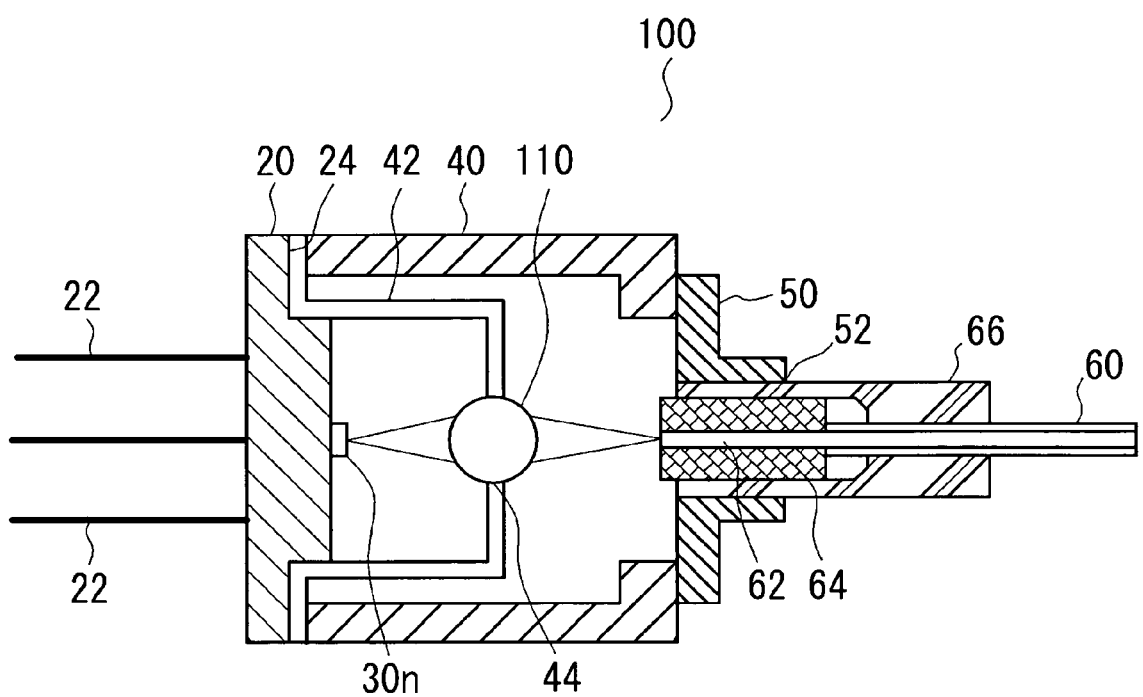
FIG. 6 is a sectional view of a module according to a second embodiment of the present invention.

A description will now be given of a module according to a second embodiment of the present invention with reference to FIG. 6 in which parts that are the same as those shown in FIG. 1 are given the same reference numerals. A module 100 shown in FIG. 6 differs from the module of the first embodiment in that a single spherical lens 110 is interposed between the VCSEL chips 30n and the optical fiber 60. The spherical lens 110 is positioned in the opening 44 of the support member 42 and is fixed thereto so that the optical axis of the spherical lens 110 coincides with the centers of the mesas of the VCSEL chips 30n. The adjuster 66 can slide in the direction in which the adjuster 66 comes close to or gets away from the VCSEL chips. As in the case of the first embodiment, it is possible to position the optical fiber 60 in the axial and perpendicular directions by using the holder 50. The laser lights of different wavelengths emitted from the mesas 34n are condensed by the spherical lens 110, and is coupled in the fiber core 62. The use of the spherical lens 110 increases the number of components by one. However, another advantage is brought about in which the adjuster 66 or the fiber core 62 can be attached with a lower precision than that required to attach these components in the first embodiment. The spherical lens 110 maybe replaced by a convex lens having two opposing convex surfaces or another convex lens having two opposing surfaces, one of which has a convex surface and the other has a flat surface. In the second embodiment, the mesas 34n of the VCSEL chips 30n may be positioned in the chip centers or in the offset arrangement.

Figure 7:
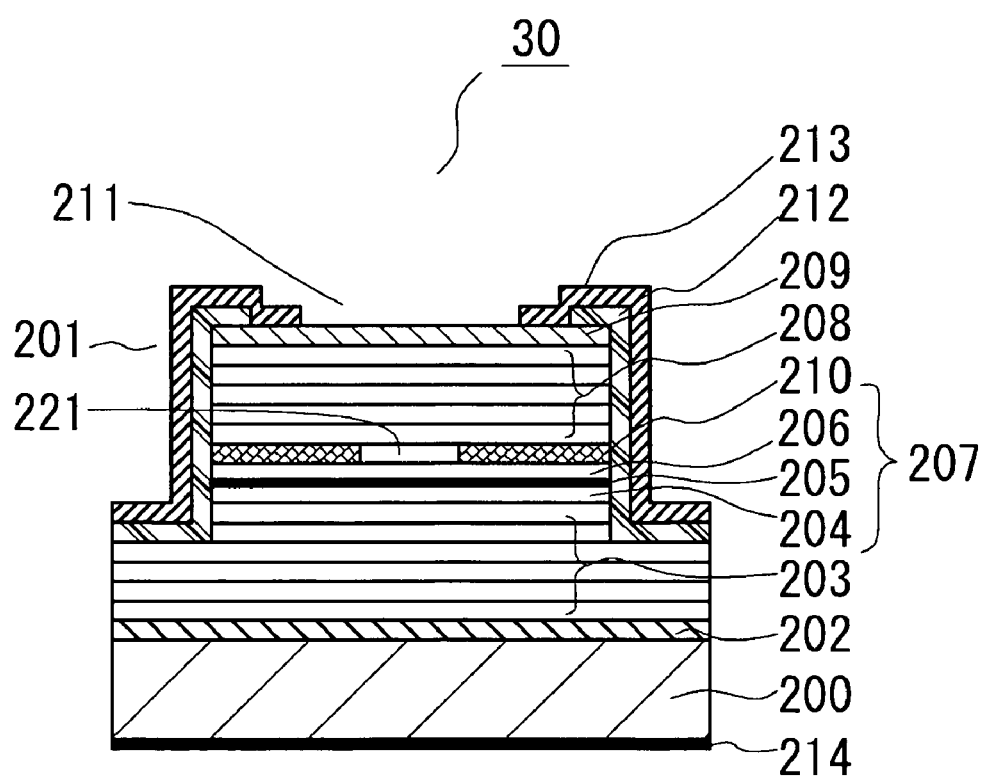
FIG. 7 is a sectional view of one VCSEL chip.

A description will now be given of the structures of the VCSEL chips. Each VCSEL 30n is configured as shown in FIG. 7. On an n-type GaAs substrate 200, there are laminated, in the following order, an n-type buffer layer 202, an n-type DBR (Distributed Bragg Reflector) 203, an active layer 207, a p-type upper DBR 208, and a p-type contact layer 209. The active layer 207 is composed of an undoped lower spacer layer 204, an undoped quantum well active layer 205, and an undoped upper spacer layer 206. These semiconductor layers are anisotropically etched to thus form a mesa 201. An interlayer insulation film 212 covers the sidewall and the top surface of the mesa 201. An opening is formed in the interlayer insulation film 121 above the contact layer 209. A p-side electrode layer 213 makes an ohmic contact with the contact layer 209 through the opening of the interlayer insulation film 212. A laser emission aperture 211 via which laser light is emitted is formed in the center of the p-side electrode layer 213. The p-side electrode layer 213 extends up to an electrode pad (not shown) formed on the bottom of the mesa. A p-type AlAs layer 210 is inserted into the lowermost layer of the upper DBR 208. The AlAs layer 210 has an aperture of a circular shape surrounded by an oxidized region formed by oxidizing part of the AlAs layer 210 from its sidewall. Light and current are confined in the aperture 221. An n-side electrode 214 is provided on the backside of the substrate 200.

The lower DBR 203 is a laminate of n-type $Al_{0.9}Ga_{0.1}As$ layer and n-type $Al_{0.3}Ga_{0.7}As$ layers, each having a thickness of λ/4 nr where λ is the oscillation wavelength and nr is the refractive index of the medium. The n-type $Al_{0.9}Ga_{0.1}As$ layer and n-type $Al_{0.3}Ga_{0.7}As$ layers are alternatively laminated one by one to a thickness equal to 40.5 periods. The lower DBR 203 has a carrier concentration of $3 \times 10^{18}$ cm$^{-3}$ after it is doped with silicon serving as the n-type impurity.

The lower spacer layer 204 of the active region 207 is an undoped $Al_{0.6}Ga_{0.4}As$ layer. The quantum well active layer 205 includes an undoped $Al_{0.11}Ga_{0.89}As$ quantum well layer and an undoped $Al_{0.3}Ga_{0.7}As$ barrier layer. The upper spacer layer 206 is an undoped $Al_{0.6}Ga_{0.4}As$ layer.

The upper DBR 208 is a laminate of p-type $Al_{0.9}Ga_{0.1}As$ layers and p-type $Al_{0.3}Ga_{0.7}As$ layers, each having a thickness of λ/4 nr where λ is the oscillation wavelength and nr is the refractive index of the medium. The p-type $Al_{0.9}Ga_{0.1}As$ layer and p-type $Al_{0.3}Ga_{0.7}As$ layers are alternatively laminated one by one to a thickness equal to 30 periods. The upper DBR 208 has a carrier concentration of $3 \times 10^{18}$ cm$^{-3}$ after it is doped with carbon serving as the p-type impurity.

The p-type contact layer 209 is a GaAs layer, which is 20 nm thick and has a carbon concentration of $1 \times 10^{20}$ cm$^{-3}$. The p-side electrode 213 is a laminate of Ti/Au.

The first and second embodiments employ the four VCSEL chips 30a, 30b, 30c and 30d having wavelengths of 780 nm, 800 nm, 820 nm and 840 nm, which wavelengths are separated by 20 nm. The oscillation wavelengths of the VCSEL chips 30n may be changed by adjusting the materials of the quantum well active layer 205, for example, the ratio of Al to Ga, so that the VCSEL chips 30a through 30d can oscillate with the above-mentioned wavelengths. Each of the layers that form the lower DBR 203 and the upper DBR 208 has a thickness (λ/4 nr) corresponding to the respective wavelength.

Figure 8A:
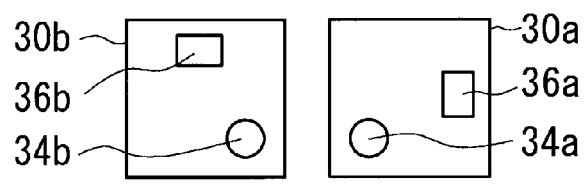
FIG. 8A show an arrangement in which two VCSEL chips are mounted.
Figure 8B:
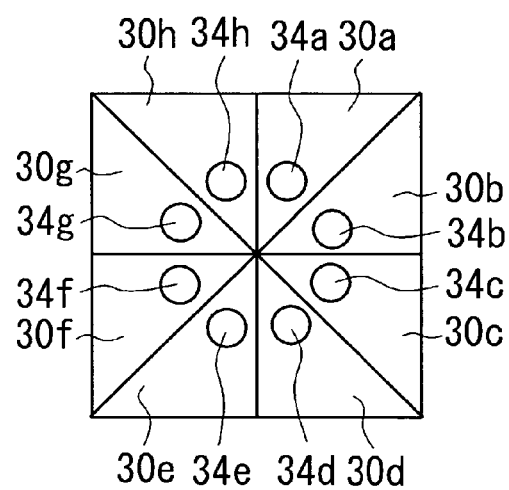
FIG. 8B shows an arrangement in which eighth VCSEL chips are mounted.

The first and second embodiments employ the four VCSEL chips having the mutually different wavelengths. However, an arbitrary number of VCSEL chips may be used. For example, FIG. 8A shows an example, in which two VCSEL chips 30a and 30b are mounted on the mounter. FIG. 8B shows another example, in which eight VCSEL chips 30a through 30h are mounted to the mounter. Preferably, the VCSEL chips are arranged so that the emitting points (mesas) thereof are close to each other.

The number of VCSEL chips mounted on the mounter may not be equal to the number of wavelengths to be multiplexed. For example, only two desired wavelengths among the four different wavelengths of the four VCSEL chips on the mounter may be multiplexed. The VCSEL chips in the module may have the mutually different wavelengths, or some VCSEL chips may have the same wavelength. Besides the setting of different wavelengths, a module may include VCSEL chips having different optical characteristics such as different laser polarized directions, divergence angles or spot sizes.

Figure 9A:
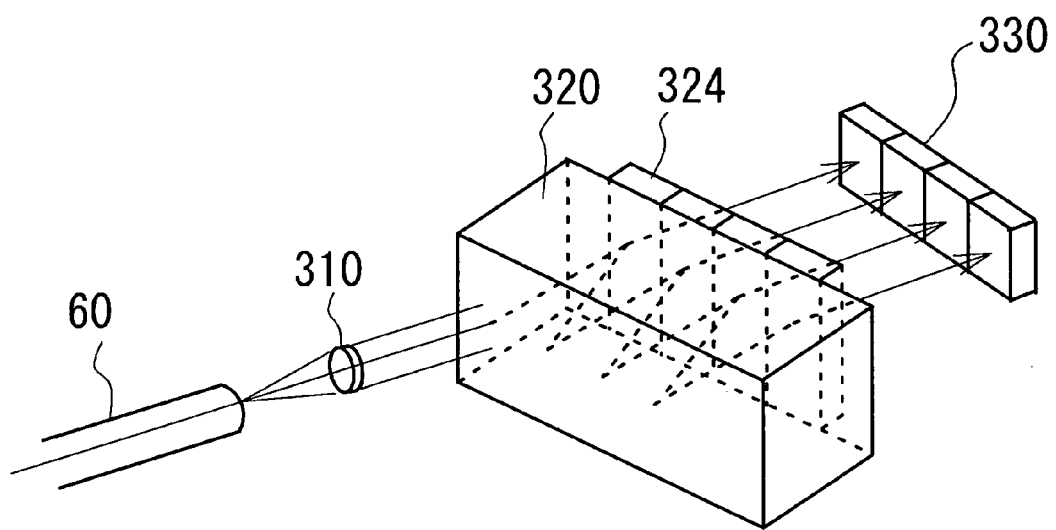
FIG. 9A is a perspective view of a module on a receive side used in an optical WDM communication system.
Figure 9B:
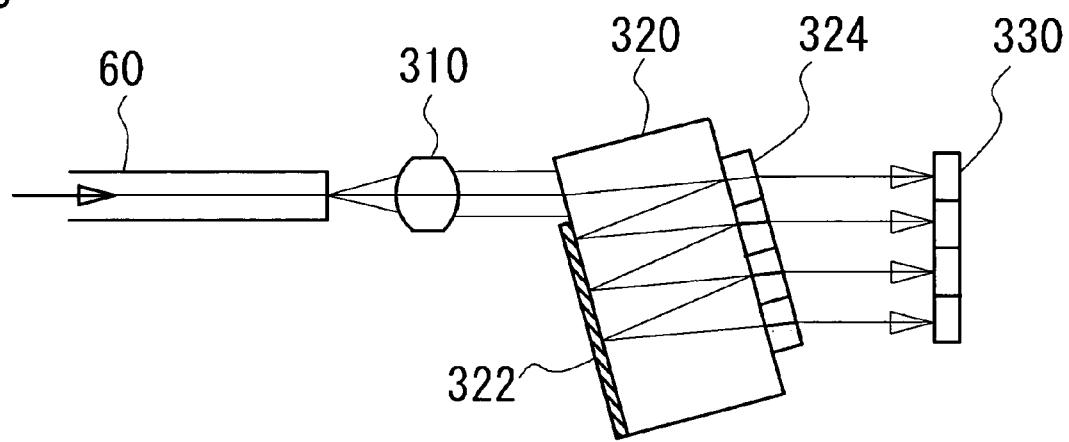
FIG. 9B is a schematic plan view of the module shown in FIG. 9A.

FIGS. 9A and 9B show an optical WDM communication system equipped with the module according to the first embodiment of the present invention. The lights multiplexed by the module 10 are transmitted to a module on the receive side via the optical fiber 60. The module 300 on the receive side includes a collimator lens 310, a wavelength splitter 320, and photodiodes 330. The multiplexed lights in the optical fiber 60 are collimated by the collimator lens 310, and are then incident to the wavelength splitter 320. The wavelength splitter 320 is a combination of a mirror coat 322 and dichroic mirrors 324 and is capable of splitting the multiplexed lights into the original lights on the wavelength basis. The split lights are converted into electric signals by the photodiodes 330.

According to the present invention, the lights emitted from the semiconductor laser chips are coupled directly in the optical fiber, so that less-expensive WDM communication modules can be provided. The optical WDM communication systems equipped with the above modules realize economical optical communications and cope with an increased optical transmission capacity at a low cost.

As described above, the module for the optical wavelength division multiplexing communication includes: semiconductor lasers emitting lights of wavelengths; a support member on which the semiconductor lasers are mounted; an optical fiber to which the lights emitted from the semiconductor lasers are incident; and a component that positions the optical fiber with respect to the support member and fixes the optical fiber thereto. The lights emitted from the semiconductor laser devices can directly be taken in the optical fiber, so that no optical components such as lenses are needed between the semiconductor laser devices and the optical fiber. Thus, the module can be assembled by a reduced number of components. Only the optical fiber should be aligned, so that the adjustment work can be simplified and less-expensive module can be provided.

The semiconductor lasers may include surface-emitting semiconductor laser chips. It is therefore possible to flexibly adjust the differences between the adjacent wavelengths of the chips. Thus, the module can be suitable applied to multiplexing communications such as CWDM in which the wavelength intervals are as long as 20 nm or longer.

The emitting points of the surface-emitting semiconductor laser chips are arranged close to an optical axis of the optical fiber. For example, surface-emitting semiconductor chips have mesas on substrates, and the mesas are located at positions that are offset from centers of the substrates. For example, the substrates have a square or rectangular shape, and are offset from two crossing sides of the substrates at an equal distance. The substrates are not limited to the square or rectangular shape but may have a triangle shape having a sharp end. The chips with the offset emitting points are arranged close to each other, so that the spacing or pitch between the adjacent emitting points can be reduced. This allows the lights emitted from the chips to be directly incident to the optical fiber. Preferably, the optical fiber is a plastic optical fiber having a core of a relatively large size.

Preferably, the diameter (d1) of the circle inscribing emitting points of the surface-emitting semiconductor laser chips is smaller than the diameter (d2) of the core of the optical fiber. It is desired to set the diameter (d2) equal to or greater than twice the diameter (d1). The diameters (d1) of the circle inscribing or including the emitting points may be appropriated by the diagonal lines that connect the emitting points. The above condition on d1 and d2 makes it possible to take the laser lights in the optical fiber with easy alignment work.

Preferably, the optical fiber is spaced apart from the mesas of the laser chips in the axial directions of the mesas at distance of 100 micron. Preferably, the diameters d1 and d2 satisfy:

$$L \leq \frac{(d2-d1)}{2 \times \tan(\theta/2)}$$

where θ is the divergence angles of the lights emitted from the surface-emitting semiconductor laser chips. When the optical fiber is position so as to satisfy the above, the laser lights can directly be taken in the optical fiber without any lens or the like. Alternatively, a lens may be interposed between the laser chips and the optical fiber when the optical fiber is positioned at a relatively long distance from the laser chips.

The support member includes a mounter on which the semiconductor lasers are mounted, and the mounter includes a mechanism for positioning the semiconductor lasers. Preferably, the mechanism for positioning includes grooves. When the laser chips are positioned along the grooves, the chips are automatically placed in position. The support member may include a member such as a metal stem on which the mounter is placed. A housing attachable to the support member such as the metal stem can be used as a fixing member. The housing may be any of various members capable of positioning an fixing the optical fiber.

Although a few preferred embodiments of the present invention have been shown and described, it would be appreciated by those skilled in the art that changes may be made in these embodiments without departing from the principles and spirit of the invention, the scope of which is defined in the claims and their equivalents.

The entire disclosure of Japanese Patent Application No. 2003-166037 field on Jun. 11, 2003 including the specification, claims, drawings and abstract is incorporated therein by reference in its entity.

What is claimed is:

1. A module for an optical wavelength division multiplexing communication comprising:
    a plurality of semiconductor laser chips emitting lights of wavelengths;
    a support member on which the semiconductor laser chips are mounted;
    an optical fiber to which the lights emitted from the semiconductor laser chips are incident; and
    a component that positions the optical fiber with respect to the support member and fixes the optical fiber thereto, wherein the semiconductor laser chips have mesas on substrates, and the mesas are located at positions that are offset from centers of the substrates.

2. A module for an optical wavelength division multiplexing communication comprising:
- a plurality of semiconductor laser chips emitting lights of wavelengths;
- a support member on which the semiconductor laser chips are mounted;
- an optical fiber to which the lights emitted from the semiconductor laser chips are incident; and
- a component that positions the optical fiber with respect to the support member and fixes the optical fiber thereto,
- wherein the semiconductor laser chips have mesas on substrates, and the mesas are located at positions that are offset from centers of the substrates, and
- wherein the substrates have a square or rectangular shape, and are offset from two crossing sides of the substrates at an equal distance.

3. A module for an optical wavelength division multiplexing communication comprising:
- a plurality of semiconductor laser chips emitting lights of wavelengths wherein the semiconductor laser chips have mesas on substrates;
- a support member on which the semiconductor laser chips are mounted;
- an optical fiber to which the lights emitted from the semiconductor laser chips are incident; and
- a component that positions the optical fiber with respect to the support member and fixes the optical fiber thereto, wherein a diameter (d1) of a circle inscribing emitting points of the semiconductor laser chips is smaller than a diameter (d2) of a core of the optical fiber.

4. A module for an optical wavelength division multiplexing communication comprising:
- a plurality of semiconductor laser chips emitting lights of wavelengths wherein the semiconductor laser chips have mesas on substrates;
- a support member on which the semiconductor laser chips are mounted;
- an optical fiber to which the lights emitted from the semiconductor laser chips are incident; and
- a component that positions the optical fiber with respect to the support member and fixes the optical fiber thereto,
- wherein a diameter (d1) of a circle inscribing emitting points of the surface-emitting semiconductor laser chips is smaller than a diameter (d2) of a core of the optical fiber, and
- wherein the diameter (d2) is equal to or greater than twice the diameter (d1).

5. A module for an optical wavelength division multiplexing communication comprising:
- a plurality of semiconductor laser chips emitting lights of wavelengths;
- a support member on which the semiconductor laser chips are mounted;
- an optical fiber to which the lights emitted from the semiconductor laser chips are incident; and
- a component that positions the optical fiber with respect to the support member and fixes the optical fiber thereto,
- wherein a diameter (d1) of a circle inscribing emitting points of the semiconductor laser chips is smaller than a diameter (d2) of a core of the optical fiber,
- wherein distances L from mesas of the semiconductor laser chips to the optical fiber in a direction perpendicular to axes of the mesas satisfy:

$$L \leq \frac{(d2 - d1)}{2 \times \tan(\theta/2)}$$

where $\theta$ is the divergence angles of the lights emitted from the semiconductor laser chips.

6. A module for an optical wavelength division multiplexing communication comprising:
- a plurality of semiconductor laser chips emitting lights of wavelengths wherein the semiconductor laser chips have mesas on substrates;
- a support member on which the semiconductor laser chips are mounted;
- an optical fiber to which the lights emitted from the semiconductor laser chips are incident; and
- a component that positions the optical fiber with respect to the support member and fixes the optical fiber thereto, wherein the support member includes a mounter on which the semiconductor laser chips are mounted, and the mounter includes a mechanism for positioning the semiconductor laser chips.

7. A module for an optical wavelength division multiplexing communication comprising:
- a plurality of semiconductor laser chips emitting lights of wavelengths wherein the semiconductor laser chips have mesas on substrates;
- a support member on which the semiconductor laser chips are mounted;
- an optical fiber to which the lights emitted from the semiconductor laser chips are incident; and
- a component that positions the optical fiber with respect to the support member and fixes the optical fiber thereto,
- wherein the support member includes a mounter on which the semiconductor laser chips are mounted, and the mounter includes a mechanism for positioning the semiconductor laser chips, and
- wherein the mechanism for positioning includes grooves.

* * * * *